(12) United States Patent
Takahashi et al.

(10) Patent No.: US 8,017,713 B2
(45) Date of Patent: Sep. 13, 2011

(54) PRODUCTION APPARATUS OF POLYCARBONATE RESIN AND PRODUCTION METHOD OF POLYCARBONATE RESIN

(75) Inventors: Kazuyuki Takahashi, Kitakyushu (JP); Ryuuji Uchimura, Kitakyushu (JP); Toshiyuki Hamano, Yokkaichi (JP); Masaaki Miyamoto, Kitakyushu (JP); Kodama Miyamoto, legal representative, Fukuoka (JP); Taro Miyamoto, legal representative, Fukuoka (JP); Hideo Miyamoto, legal representative, Fukuoka (JP); Hanae Miyamoto, legal representative, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 37 days.

(21) Appl. No.: 12/304,791

(22) PCT Filed: Mar. 29, 2007

(86) PCT No.: PCT/JP2007/056989
§ 371 (c)(1),
(2), (4) Date: Oct. 7, 2009

(87) PCT Pub. No.: WO2007/145010
PCT Pub. Date: Dec. 21, 2007

(65) Prior Publication Data
US 2010/0137549 A1 Jun. 3, 2010

(30) Foreign Application Priority Data

Jun. 15, 2006 (JP) ................................. 2006-166620
Jun. 16, 2006 (JP) ................................. 2006-167047
Feb. 22, 2007 (JP) ................................. 2007-042180

(51) Int. Cl.
*C08G 63/00* (2006.01)
*C08G 63/02* (2006.01)

(52) U.S. Cl. ........ 528/176; 422/129; 422/131; 422/232; 422/312; 526/64; 526/65; 526/106; 526/112; 528/196; 528/198

(58) Field of Classification Search ................. 422/129, 422/131, 312, 232; 526/64, 65, 106, 112; 528/196, 198, 176
See application file for complete search history.

(56) References Cited

U.S. PATENT DOCUMENTS

| 6,037,437 A | 3/2000 | Komiya et al. |
| 7,754,845 B2 * | 7/2010 | Hamano et al. ............... 528/196 |

FOREIGN PATENT DOCUMENTS

| JP | 6 49197 | 2/1994 |
| JP | 10 226723 | 8/1998 |
| JP | 11 310631 | 11/1999 |
| JP | 2000 1537 | 1/2000 |
| JP | 2000 7772 | 1/2000 |
| JP | 2000 63507 | 2/2000 |
| JP | 2000 198839 | 7/2000 |
| JP | 2000-212270 A | 8/2000 |
| JP | 2003 183380 | 7/2003 |
| JP | 2003 192782 | 7/2003 |
| JP | 2005 42014 | 2/2005 |
| JP | 2005 145841 | 6/2005 |

OTHER PUBLICATIONS

GCC Novelty Search Report mailed Apr. 22, 2010 in corresponding GCC Application No. GCC/P/2007/8494.
GCC Examination Report completed Apr. 6, 2010 in corresponding GCC Application No. GCC/P/2007/8494.
Office Action issued Sep. 17, 2010, in Chinese Patent Application No. 200780007965.1 with English-language translation.
Office Action issued on Feb. 15, 2011 in the corresponding Korean Patent Application No. 10-2008-7021754 (with English Translation).

* cited by examiner

*Primary Examiner* — Terressa M Boykin
(74) *Attorney, Agent, or Firm* — Oblon, Spivak, McClelland, Maier & Neustadt, L.L.P.

(57) ABSTRACT

An apparatus of a polycarbonate resin having polymerization tanks is provided. In supplying a molten reactant to a liquid phase in a polymerization tank, or supplying the molten reactant to a gas phase in the polymerization tank by an insertion pipe, in at least one polymerization tank, and/or producing a polycarbonate resin by an ester exchange reaction between an aromatic dihydroxy compound and a carbonic diester by using three vertical polymerization tanks and one horizontal polymerization tank, a wall surface temperature T of a distillation pipe is set higher than a boiling point t1 of by-produced phenol such that the relationship of the boiling point t1 of the by-produced phenol under a pressure in at least a third vertical polymerization tank, the wall surface temperature T of the distillation pipe and an inner temperature t2 of the third vertical polymerization tank satisfies $t1 < T \leq t2$.

21 Claims, 4 Drawing Sheets

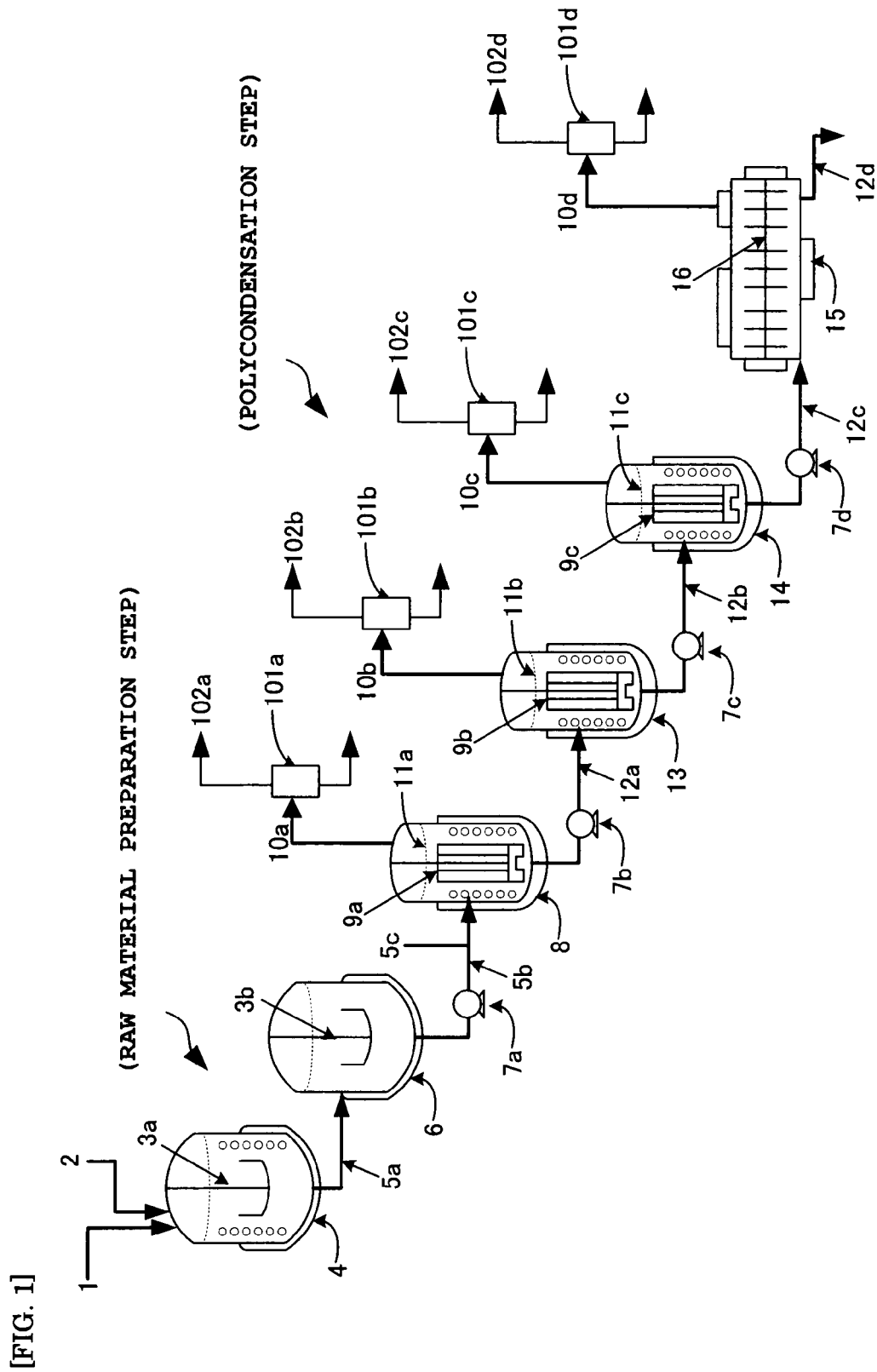
[FIG. 1]

[FIG. 2A]
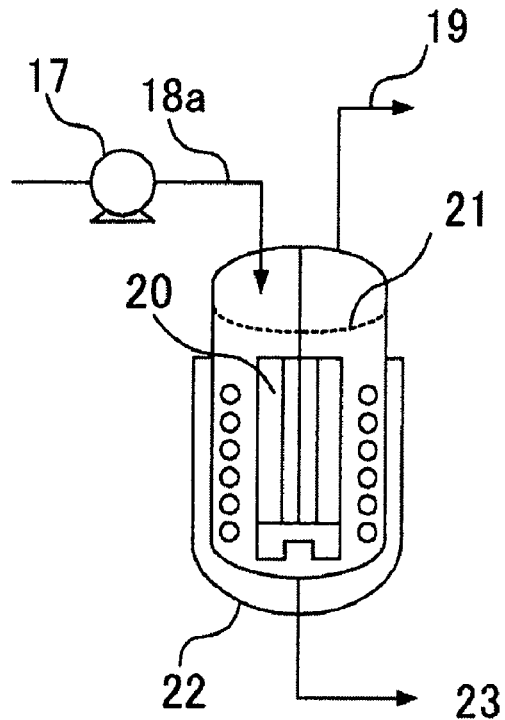
[FIG. 2B]
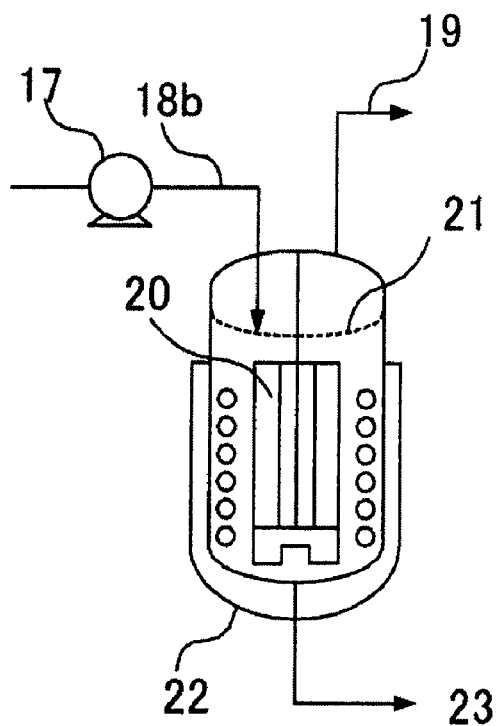

[FIG. 2C]
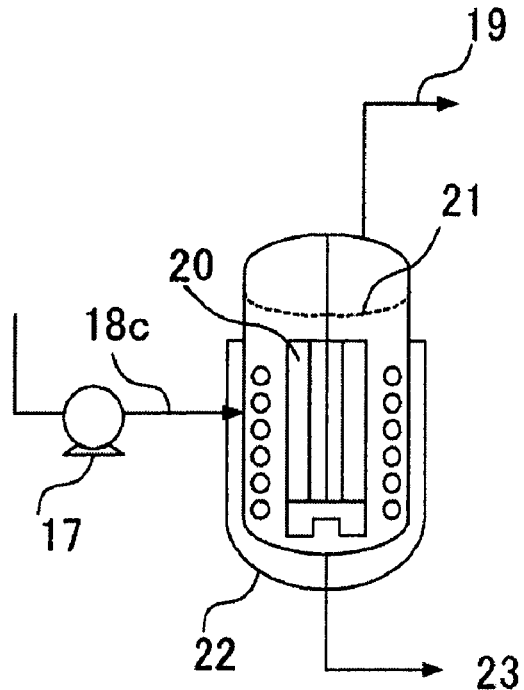
[FIG. 2D]
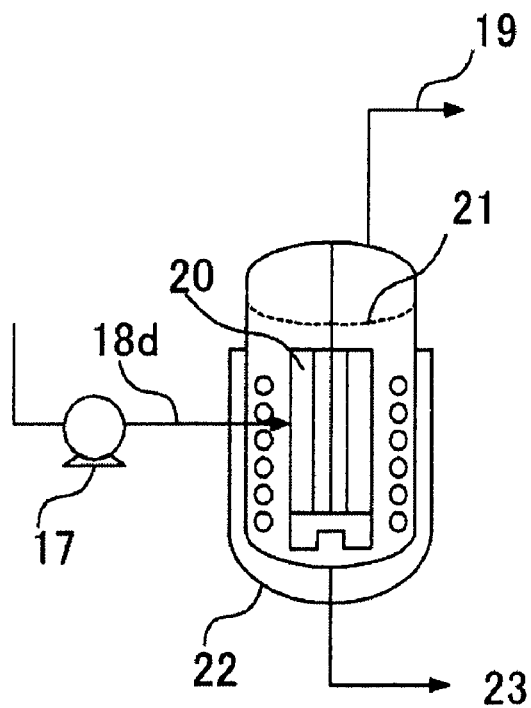

[FIG. 3]
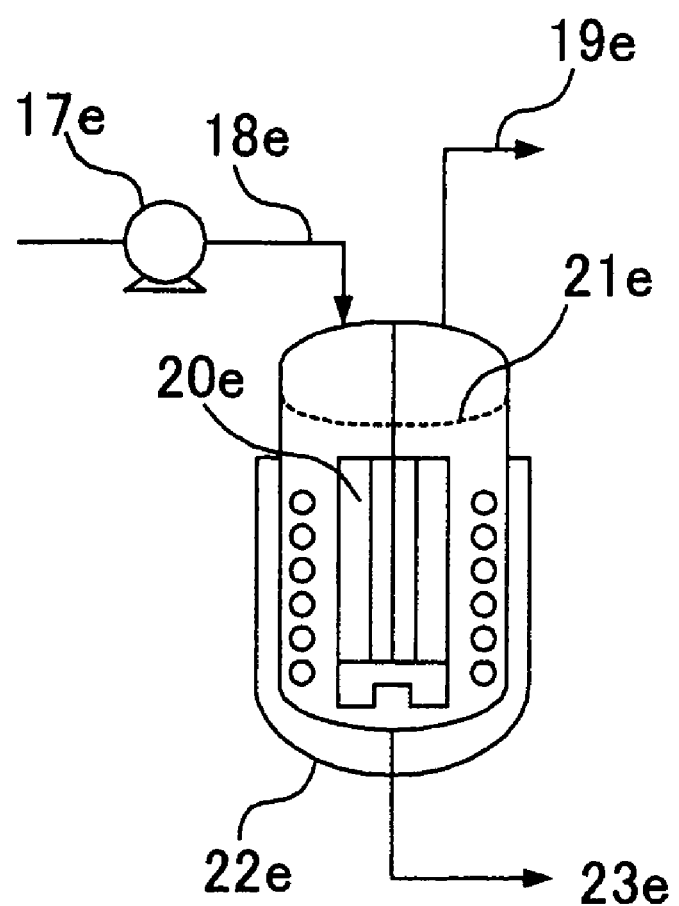

PRODUCTION APPARATUS OF POLYCARBONATE RESIN AND PRODUCTION METHOD OF POLYCARBONATE RESIN

TECHNICAL FIELD

The present invention relates to a production apparatus of a polycarbonate resin and a production method of a polycarbonate resin. More particularly, it relates to a production method of a polycarbonate resin, in which generation of foreign matters and incorporation of foreign matters into the polycarbonate resin are reduced.

BACKGROUND ART

A polycarbonate resin is widely used in many fields as engineering plastics utilizing its excellent heat resistance, impact resistance, transparency and dimensional stability. A method of introducing phosgene under mixing an alkali aqueous solution of an aromatic dihydroxy compound and a halogen organic solvent to thereby reacting the aromatic dihydroxy compound and phosgene at the interface (interfacial method) and an ester exchange method of reacting an aromatic dihydroxy compound and a carbonic diester under a molten state (melt process) are known as an industrial production method of this polycarbonate resin.

Where a polycarbonate resin is produced by the latter ester exchange method (melt process), in general a carbonic diester and an aromatic dihydroxy compound as raw materials are dissolved, an ester exchange catalyst is added to this, and stirring is carried out under heating in a polymerization tank under reduced pressure. Polycondensation reaction by an ester exchange reaction proceeds while distilling by-products such as aromatic monohydroxy compounds and/or aliphatic monohydroxy compounds, and a polycarbonate resin is produced (see Patent Document 1).

By the way, the melt process may give rise to the problems such that white foreign matters are incorporated into a polycarbonate resin and a pipe line clogs, during continuous operation for a long period of time, and for those problems, various countermeasures are reported. For example, there are the following methods; a method of preventing solidification of distilled components by providing a reflux piping having a predetermined gradient in an apparatus of distilling phenol and diphenyl carbonate by by-produced during a polycondensation reaction, under reduced pressure (see Patent Document 2), a method of washing a polymerization tank, a transfer piping and the like with a monohydroxy compound or the like within 24 hours after completion of continuous operation (see Patent Document 3), and a method of controlling surface temperature of a polymerization tank with which a low molecular weight polycarbonate formed in the course of polycondensation reaction contacts, a transfer piping of a molten reactant, stirring blades and the like, thereby suppressing crystallization (see Patent Document 4).

Patent Document 1: JP-A-2003-192782 (see FIG. 1)
Patent Document 2: JP-A-2005-145841
Patent Document 3: JP-A-2005-042014
Patent Document 4: JP-A-2000-198839

DISCLOSURE OF THE INVENTION

Problems that the Invention is to Solve

By the way, where a polycarbonate resin is continuously produced by an ester exchange reaction (melt process) as described above, a method is generally carried out that a molten mixture of raw materials is supplied to a plurality of polymerization tanks controlled to high temperature and reduced pressure state to thereby efficiently distill away phenol and the like by-produced during the reaction, and further, the degree of polymerization is successively increased while continuously supplying a molten reactant to the subsequent stage polymerization tanks.

However, for example, in the case of a method that a molten mixture of raw materials or a molten reactant is directly introduced into a polymerization tank from a supply port provided on a top board at the upper portion of the polymerization tank, there is the tendency that the amount of foreign matters in a final product increases. This is explained on the basis of the drawings.

FIG. 3 is a view for explaining the conventional production apparatus of a polycarbonate resin. In FIG. 3, a mixture of a molten mixture of raw materials and a catalyst is supplied to a vertical polymerization tank 22e equipped with a stirring blade 20e via a supply piping 18e by a supply pump 17e, an ester exchange reaction is carried out in the predetermined average residence time while maintaining a liquid level 21e, and a molten reactant is discharged to the next step via a delivery piping 23e from the bottom of the vertical polymerization tank 22e. The inside of the vertical polymerization tank 22e is maintained in a reduced pressure state by a given pressure reducing device (not shown). Further, by-produced phenol and the like are distilled from a by-product distillation pipe 19e.

When a molten mixture of raw materials or a molten reactant is directly introduced into the vertical polymerization tank 22e maintained in a reduced pressure state from a supply port provided on a top board at the upper portion of the vertical polymerization tank 22e as shown in FIG. 3, there is the case that the molten mixture of raw materials or the molten reactant scatters at an outlet of the supply port, and adheres to the top board of the vertical polymerization tank 22e, the stirring blade 20e or the like. Further, there is the case that the molten mixture of raw materials or the like scattered to a sideboard drops down along a wall surface, and this may results in variation of a raw material mixing ratio.

Further, when such an adherent grows, it liable to convert into crystallized foreign matters, burned foreign matters or the like, and when those drop in the molten reactant, the amount of foreign matters in the final product increases. Therefore, its solving method is required.

On the other hand, there is a separate problem apart from this. Production of a polycarbonate resin by a melt process is generally carried out by maintaining the whole production apparatus in a reduced pressure state by a pressure reducing device in order to efficiently distill away phenol and the like by-produced during the ester exchange reaction. Due to this, disadvantages such that liquid reservoir generates on an inner wall of the distillation pipe by the distilled components such as phenol by-produced in a reaction under reduced pressure, or diphenyl carbonate entrained, and the distilled components thus collected are solidified to clog the distillation pipe are not easily eliminated. As a result, there are the problems such that color tone of the polycarbonate resin produced becomes unstable, and production efficiency deteriorates because of stopping operation and cleaning up the distillation pipe, and the like.

The present invention has been made to solve those problems in the case of continuously producing a polycarbonate resin using a production apparatus comprising plurality of polymerization tanks which are connected.

That is, one object of the present invention is to provide a production apparatus of a polycarbonate resin, which makes it difficult to form adherents on a top board and the like of a polymerization tank, and reduces generation of foreign matters.

Further, another object of the present invention is to provide a production method of a polycarbonate resin in which crystallized foreign matters and "burned" foreign matters are reduced in production of a polycarbonate resin by a melt process.

Means for Solving the Problems

As a result of keen investigations to solve the above problems, the present inventors have found that when an insertion pipe having an opening at a gas phase part in a polymerization tank is fitted to a supply port provided on a top board at the upper portion of the polymerization tank, and a molten mixture of raw materials or the like is introduced into the polymerization tank through the insertion pipe, scattered matters are prevented from adhering to a top board and the like of the polymerization tank.

The present inventors have further found that when a wall surface temperature of a distillation pipe for by-products distilled from a polymerization tank is set to a temperature higher than a boiling point of a monohydroxy compound by-produced, liquid reservoir or the like is not generated in the distillation pipe. Further, they have found that when a backflow preventer is provided in a distillation pipe, even if distilled components causing crystallized foreign matters and the like retain in the distillation pipe, those are prevented from flowing backward into a polymerization tank.

Further, the present inventors have found that incorporation of foreign matters into a polycarbonate resin is reduced by at least the above one finding or by the combination of all of the findings. The present invention has been completed based on those findings.

According to the present invention, there is provided a production apparatus of a polycarbonate resin, characterized in that in a continuous production apparatus of a polycarbonate resin using a plurality of polymerization tanks, a molten reactant is supplied in a liquid phase in at least one polymerization tank, or is supplied in a gas phase part in the at least one polymerization tank through an insertion pipe.

The insertion pipe used here preferably has an opening thereof at a gas phase part between a top board of the polymerization tank and a liquid level of a molten reactant in the polymerization tank.

The polymerization tank is preferably a vertical polymerization tank equipped with a stirring device.

In the case of the vertical polymerization tank, the molten reactant is preferably supplied in a liquid phase in the vertical polymerization tank through an insertion pipe or a transfer piping from the side of the vertical polymerization tank.

Further, the production apparatus of a polycarbonate resin is an apparatus having a plurality of vertical polymerization tanks which are connected in series and at least one horizontal polymerization tank subsequent to the vertical polymerization tank. It is preferable that each polymerization tank has a pressure reducing device for maintaining pressure in the tank in reduced pressure, a distillation pipe for distilling away by-products, and a condenser for condensing by-products distilled into the outside of the tank, and the polycarbonate resin is produced by an ester exchange reaction between an aromatic dihydroxy compound and a carbonic diester.

In the production apparatus of a polycarbonate resin, at least an inner wall portion of the distillation pipe is preferably formed of a material having an iron content of 20% or more, and the distillation pipe may further be provided with a backflow preventer for preventing a distillate from flowing backward.

Next, according to the present invention, there is provided a production method of a polycarbonate resin which is a production method of a polycarbonate resin by an ester exchange reaction between an aromatic dihydroxy compound and a carbonic diester, and is characterized by having a raw material preparation step of preparing a molten mixture of raw materials of an aromatic dihydroxy compound and/or a carbonic diester, and a polycondensation step of continuously polycondensing the molten mixture of raw materials prepared by the raw material preparation step in the presence of a ester exchange catalyst using a plurality of polymerization tanks, wherein the polycondensation step is that in at least one polymerization tank, a molten reactant by an ester exchange reaction is directly supplied in a liquid phase part in the polymerization tank, or supplied to a gas phase part in the polymerization tank through an insertion pipe having an opening at the gas phase part in the polymerization tank.

The polycondensation step is preferably that the molten reactant by an ester exchange reaction is supplied to at least one polymerization tank through the insertion pipe, and the insertion pipe has an opening at a gas phase part between a top board of the polymerization tank and a liquid level of the molten reactant in the polymerization tank.

Further, the polycondensation step is preferably that a vertical polymerization tank is used as the polymerization tank, the molten reactant by an ester exchange reaction is supplied to at least one polymerization tank through the insertion pipe, and the molten reactant is supplied to a liquid phase in the polymerization tank from the side of the polymerization tank through the insertion pipe or a transfer piping.

Further, the polycondensation step is preferably that a production apparatus having a plurality of vertical polymerization tanks which are connected in series and at least one horizontal polymerization tank subsequent to the vertical polymerization tank is used, and each polymerization tank has a pressure reducing device for maintaining pressure in the tank in reduced pressure, a distillation pipe for distilling away by-products, and a condenser for condensing by-products distilled into the outside of the tank.

Further, according to the present invention, there is provided a production method of a polycarbonate resin which is a production method of a polycarbonate resin by an ester exchange reaction between an aromatic dihydroxy compound and a carbonic diester, and is characterized in that the relationship of a boiling point t1 (° C.) of a by-produced monohydroxy compound under a pressure in a reactor which conducts an ester exchange reaction, a wall surface temperature T (° C.) of a distillation pipe which distills a by-produced monohydroxy compound from the reactor, and an inner temperature t2 (° C.) in the reactor is satisfied with the following formula (1).

$$t1 < T \leq t2 \tag{1}$$

It is preferable that the relationship of T (° C.) and t2 (° C.) is further satisfied with the following formula (2).

$$230(°C.) < T \leq t2 \tag{2}$$

Further, the reactor is preferably a vertical polymerization tank provided with a pressure reducing device for maintaining pressure in the tank in reduced pressure, and a condenser for condensing a by-produced monohydroxy compound distilled into the outside of the reactor from the distillation pipe.

Further, the distillation pipe provided in the vertical polymerization tank is preferably equipped with a backflow preventer which prevents a distillate from flowing backward.

Further, at least an inner wall portion of the distillation pipe is preferably formed of an iron material having an iron content of 20% or more, and the by-produced monohydroxy compound is preferably phenol.

Further, according to the present invention, there is provided a production method of a polycarbonate resin, characterized in that in conducting a continuous ester exchange reaction between an aromatic dihydroxy compound and a carbonic diester using a polymerization apparatus having a plurality of vertical polymerization tanks which are connected in series, at least one horizontal polymerization tank connected to the vertical polymerization tank, and a distillation pipe provided at the upper portion of the at least one vertical polymerization tank, which distills a monohydroxy compound by-produced in the ester exchange reaction from the vertical polymerization tank, a boiling point t1 (° C.) of a by-produced monohydroxy compound under a pressure in the vertical polymerization tank, an inner temperature t2 (° C.) in the vertical polymerization tank, and a wall surface temperature T (° C.) of the distillation pipe are satisfied with the following formula (3).

$$t1 < T \leq t2 \quad (3)$$

It is more preferable that in a vertical polymerization tank located just before at least the horizontal polymerization tank, t1 (° C.), t2 (° C.) and T (° C.) are satisfied with the above formula (3).

Further, it is preferable that in the vertical polymerization tank, the distillation pipe connected to the vertical polymerization tank is further provided with a backflow preventer which prevents a distillate from flowing backward.

Further, it is preferable that the molten reactant by an ester exchange reaction between an aromatic dihydroxy compound and a carbonic diester is supplied to at least one vertical polymerization tank through an insertion pipe, and the molten reactant is supplied to a liquid phase in the polymerization tank from the side of the polymerization tank through the insertion pipe or a transfer piping.

Advantage of the Invention

According to the present invention, a polycarbonate resin having reduced crystallized foreign matters and "burned" foreign matters can be produced.

BRIEF DESCRIPTION OF THE DRAWINGS

FIG. 1 is a view showing one example of the production apparatus of a polycarbonate resin in the present invention.

FIG. 2A is a view showing one example of the embodiment of a supply piping connected to a polymerization tank in the present invention.

FIG. 2B is a view showing one example of other embodiment of a supply piping connected to a polymerization tank in the present invention.

FIG. 2C is a view showing one example of other embodiment of a supply piping connected to a polymerization tank in the present invention.

FIG. 2D is a view showing one example of other embodiment of a supply piping connected to a polymerization tank in the present invention.

FIG. 3 is a view for explaining the conventional production apparatus of a polycarbonate resin.

DESCRIPTION OF REFERENCE NUMERALS AND SIGNS

1 . . . . Supply port of diphenyl carbonate
2 . . . Supply port of bisphenol A
3a, 3b . . . Anchor type stirring blade
4 . . . . First raw material mixing tank
5a, 5b, 12a, 12b, 12c, 18a, 18b, 18c, 18d, 18e . . . Supply piping
5c . . . . Catalyst supply port
6 . . . Second raw material mixing tank
7a . . . Raw material supply pump
7b, 7c, 7d, 17, 17e . . . Supply pump
8 . . . First vertical polymerization tank
9a, 9b, 9c . . . MAXBLEND blade
10a, 10b, 10c, 10d, 19, 19e . . . By-product distillation pipe
11a, 11b, 11c, 21, 21e . . . Liquid level
13 . . . Second vertical polymerization tank
14 . . . Third vertical polymerization tank
15 . . . Fourth horizontal polymerization tank
16, 20, 20e . . . Stirring blade
22, 22e . . . Vertical polymerization tank
12d, 23, 23e . . . Delivery piping
101a, 101b, 101c, 101d . . . Condenser
102a, 102b, 102c, 102d . . . Pressure reducing device

BEST MODE FOR CARRYING OUT THE INVENTION

The best mode for carrying out the invention (hereinafter, the embodiment of the invention) is described in detail below. The present invention is not limited to the following embodiments, and can carry out with various modifications within a scope of its gist. Further, the drawings used are to explain the present embodiment, and do not show the actual size.
(Polycarbonate Resin)

In the present invention, a polycarbonate resin is produced by melt polycondensation based on an ester exchange reaction between an aromatic dihydroxy compound and a carbonic diester.

A method of producing a polycarbonate resin by using an aromatic dihydroxy compound and a carbonic diester as raw materials, and continuously conducting melt polycondensation reaction in the presence of an ester exchange catalyst is described below.
(Aromatic Dihydroxy Compound)

The aromatic dihydroxy compound used in the present embodiment includes a compound represented by the following general formula (1).

[Chem. 1]

General Formula (1)

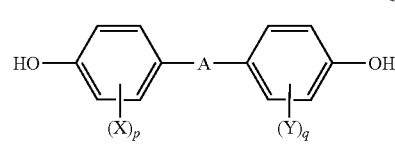

In the general formula (1), A represents a single bond, a straight-chain, branched or cyclic divalent hydrocarbon group having from 1 to 10 carbon atoms which may be substituted, or a divalent group represented by —O—, —S—, —CO— or SO$_2$—. X and Y represent a halogen atom or a hydrocarbon group having from 1 to 6 carbon atoms. p and q are an integer of 0 or 1. X and Y, and p and q may be the same or different, respectively.

Specific examples of the aromatic dihydroxy compound include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)-cyclohexane; biphenols such as 4,4'-dihydroxybiphenyl and 3,3',5,5'-tetramethyl-4,4'-dihydroxybiphenyl; bis(4-hydroxyphenyl)sulfone, bis(4-hydroxyphenyl)sulfide, bis(4-hydroxyphenyl)ether, and bis(4-hydroxyphenyl)ketone.

Of those, 2,2-bis(4-hydroxyphenyl)propane (bisphenol A, hereinafter sometimes abbreviated as BPA) is preferable. Those aromatic dihydroxy compounds can be used alone or as mixtures of two or more thereof.

A part of the aromatic dihydroxy compound may be replaced by other aliphatic dihydroxy compound in a range that does not substantially impair its properties. Such an aliphatic dihydroxy compound includes a dihydric alcohol. Specific examples of the dihydric alcohol include ethylene glycol, propylene glycol, butanediol, pentanediol, hexanediol, heptanediol, octanediol, dodecanediol, neopentyl glycol, cyclohexanediol, and 1,4-dihydroxymethyl cyclohexane.

(Carbonic Diester)

The carbonic diester used in the present embodiment includes a compound represented by the following general formula (2)

[Chem. 2]

General Formula (2)

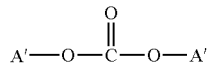

In the general formula (2), A' represents a straight-chain, branched or cyclic monovalent hydrocarbon group having from 1 to 10 carbon atoms which may be substituted. Two A's may be the same or different.

Specific examples of the carbonic diester include diphenyl carbonate, a substituted diphenyl carbonate such as ditolyl carbonate; dimethyl carbonate, diethyl carbonate and di-t-butyl carbonate.

Of those, diphenyl carbonate (hereinafter sometimes abbreviated as DPC) and a substituted diphenyl carbonate are preferable. Those carbonic diesters can be used alone or as mixtures of two or more thereof.

The carbonic diester may be replaced by dicarboxylic acid or dicarboxylic ester in an amount of preferably 50 mol % or less, and more preferably 30 molds or less.

The representative dicarboxylic acid or dicarboxylic ester includes terephthalic acid, isophthalic acid, diphenyl terephthalate and diphenyl isophthalate. When replaced by such a dicarboxylic acid or dicarboxylic ester, a polyester carbonate is obtained.

Those carboxylic diesters (including the above replaced dicarboxylic acid or dicarboxylic ester, and hereinafter the same) are used in an amount excess to the dihydroxy compound.

Specifically, the carboxylic diester is used in a molar ratio of generally from 1.01 to 1.30, and preferably from 1.02 to 1.20, to the aromatic dihydroxy compound. Where the molar ratio is smaller than 1.01, terminal OH group of a polycarbonate resin obtained increases, and thermal stability of the resin tends to deteriorate. Further, where the molar ratio is larger than 1.30, reaction rate of ester exchange lowers, making it difficult to produce a polycarbonate resin having the desired molecular weight. Additionally, the residual amount of carbonic diester in the resin increases, and this may result in odor at the time of molding or of a molding, which is not preferable.

(Ester Exchange Catalyst)

The ester exchange catalyst used in the present embodiment includes catalysts generally used in producing a polycarbonate by an ester exchange method, and is not particularly limited. In general, examples of the catalyst include basic compounds such as an alkali metal compound, a beryllium compound, a magnesium compound, an alkaline earth metal compound, a basic boron compound, a basic phosphorus compound, a basic ammonium compound, and an amine compound.

Of those ester exchange catalysts, an alkali metal compound is practically desirable. Those ester exchange catalysts may be used alone or as mixtures of two or more thereof.

The ester exchange catalyst is used in a range of from generally from $1\times10^{-9}$ to $1\times10^{-1}$ mol, and preferably from $1\times10^{-7}$ to $1\times10^{-2}$ mol, per mole of the aromatic dihydroxy compound.

The alkali metal compound includes inorganic alkali metal compounds such as hydroxides, carbonates and hydrogen carbonate compounds of alkali metals; and organic alkali metal compounds such as salts of alkali metal with alcohols, phenols or organocarboxylic acids. Examples of the alkali metal include lithium, sodium, potassium, rubidium and cesium.

Of those alkali metal compounds, a cesium compound is preferable, and cesium carbonate, cesium hydrogen carbonate and cesium hydroxide are particularly preferable.

Examples of the beryllium or magnesium compound and the alkaline earth metal compound include inorganic alkaline earth metal compounds such as hydroxides or carbonates of beryllium, magnesium and alkaline earth metals; and salts of those metals with alcohols, phenols and organocarboxylic acids. Examples of the alkaline earth metal include calcium, strontium and barium.

Specific examples include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate and strontium carbonate. Those compounds are used alone or as mixtures of two or more thereof.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethyl-methylammonium hydroxide, triethylbenzylammonium hydroxide, triethylphenylammonium hydroxide, tributylbenzylammonium hydroxide, tributylphenylammonium hydroxide, tetraphenyl-ammonium hydroxide, benzyltriphenylammonium hydroxide, methyltriphenylammonium hydroxide and butyltriphenyl-ammonium hydroxide.

Examples of the amine compound include 4-aminopyridine, 2-aminopyridine, N,N-dimethyl-4-amino-pyridine, 4-diethylaminopyridine, 2-hydroxypyridine, 2-methoxypyridine, 4-methoxypyridine, 2-dimethylamino-imidazole, 2-methoxyimidazole, imidazole, 2-mercapto-imidazole, 2-methylimidazole and aminoquinoline.

(Production Method of Polycarbonate Resin)

A production method of a polycarbonate resin is described below.

The production of a polycarbonate resin is conducted by preparing a molten mixture of raw materials of an aromatic dihydroxy compound and a carbonic diester compound as raw materials (raw material preparation step) and subjecting those compounds to a multi-stage polycondensation reaction in the presence of an ester exchange reaction catalyst under a molten state using a plurality of polymerization tanks (polycondensation step). The reaction method may be any of a batchwise method, a continuous method, and a combination of a batchwise method and a continuous method. The polymerization tanks used comprises a plurality of vertical polymerization tanks and the subsequent at least one horizontal polymerization tank. In general, those polymerization tanks are connected in series, and treatment is conducted continuously.

After the polycondensation step, a step of stopping a reaction and devolatilization removing unreacted raw materials and reaction by-products in a molten reactant, a step of adding a heat stabilizer, a release agent, a coloring material and the like, a step of shaping a polycarbonate resin into pellets having a given particle size, and the like may appropriately be added.

In the present embodiment, the molten mixture of raw materials is a molten mixture of an aromatic dihydroxy compound and a carbonic diester, and an ester change catalyst may further be contained in the molten mixture of raw materials. Further, the molten reactant means a mixture of an oligocarbonate (low molecular weight polycarbonate) and/or a polycarbonate, and at least one selected from an aromatic dihydroxy compound, a carbonic diester, an ester exchange catalyst, and other by-products and the like may be contained therein.

Each step of the production method is described below.

(Raw Material Preparation Step)

An aromatic dihydroxy compound and a carbonic diester used as raw materials of a polycarbonate resin are generally prepared as a molten mixture of raw materials using a batchwise, semibatchwise or continuous stirring tank type apparatus in an atmosphere of an inert gas such as nitrogen or argon. For example, in the case of using bisphenol A as the aromatic dihydroxy compound and diphenyl carbonate as the carbonic diester, temperature of the molten mixture of raw materials is selected from a range of generally from 20 to 180° C., and preferably from 125 to 160° C.

In this case, proportions of the aromatic dihydroxy compound and the carbonic diester are adjusted such that the carbonic diester is excess, and are adjusted such that the carbonic diester is in a proportion of generally from 1.01 to 1.30 mol, and preferably from 1.02 to 1.20 mol, per mole of the aromatic dihydroxy compound.

(Polycondensation Step)

Polycondensation by an ester exchange reaction between the aromatic dihydroxy compound and the carbonic diester is continuously conducted by multiple steps of generally 2 steps or more, and preferably from 3 to 7 steps. Specific reaction conditions are that temperature is in a range of from 150 to 320° C., pressure is in a range of from normal pressures to 0.01 Torr (1.3 Pa), and an average residence time is in a range of from 5 to 150 minutes.

In each polymerization tank in multiple steps, further high temperature and further high vacuum are set stepwise within the above reaction conditions in order to effectively discharge phenol by-produced with the progress of the polycondensation reaction. It is preferable to set low temperature as possible and a short residence time as possible to prevent deterioration of quality such as hue of the polycarbonate resin obtained.

Polycondensation by multiple steps is generally that a plurality of vertical reaction tanks equipped with stirring blades are connected, and a horizontal reaction tank is provided as a final step, thereby increasing an average molecular weight of a polycarbonate resin. The vertical reaction tanks provided are generally 2 to 5, and preferably 3 to 4.

The vertical reaction tank used herein means that an axis of rotation of a stirring blade is vertical (perpendicular direction). Shape of the vertical reaction tank used is that a ratio (L/D) of length L of a straight body part to an inner diameter D of a reaction tank is 3 or less, and preferably 0.5 to 3. Length L of the straight body part of a reaction tank means a length between two tangent lines when the shape of the reaction tank is a cylindrical double mirror, and means a distance between a tangent line of one side of a side body part and an edge face of the other side when the upper portion or lower portion of the reaction tank is a flat cover structure. The inner diameter of the reaction tank means a distance at a region which is filled with the molten reactant.

Examples of the type of the stirring blade in the vertical reaction tank include a turbine blade, paddle blade, a fardler blade, an anchor blade, a FULLZONE blade (manufactured by Kobelco Eco-Solutions Co., Ltd.), a sanmeler blade (manufactured by Mitsubishi Heavy Industries, Ltd.), a MAXBLEND blade (manufactured by S.H.I. Mechanical & Equipment Inc.), a helicalribbon blade, and a lattice-type twisting blade (manufactured by Hitachi Plant Technologies, Ltd.).

Further, the horizontal reaction tank means a reaction tank that an axis of revolution of a stirring blade is horizontal (horizontal direction). Examples of the stirring blade in the horizontal reaction tank include single shaft stirring blades such as a disc type and a paddle type, and two-shaft stirring blades such as HVR, SCR and N-SCR (manufactured by Mitsubishi Heavy Industries, Ltd.), Bivolac (manufactured by S.H.I. Mechanical & Equipment Inc.), and a spectacle-shaped blade and a lattice blade (manufactured by Hitachi Plant & Technologies, Ltd.).

The ester exchange catalyst used in polycondensation of the aromatic dihydroxy compound and the carbonic diester compound is generally previously provided as an aqueous solution. Concentration of the catalyst aqueous solution is not particularly limited, and adjusted to an optional concentration according to solubility of a catalyst in water. Other solvent such as acetone, alcohol, toluene or phenol can be selected in place of water.

Properties of water used for dissolution of the catalyst are not particularly limited so far as kind and concentration of impurities contained are constant. In general, distilled water, deionized water and the like are preferably used.

The production apparatus of a polycarbonate resin to which the present embodiment is applied is described below based on the drawings.

FIG. 1 is a view showing one example of the production apparatus of a polycarbonate resin. In the production apparatus shown in FIG. 1, the polycarbonate resin is produced through a raw material preparation step of preparing a molten mixture of raw materials of an aromatic dihydroxy compound and a carbonic diester as raw materials, and a polycondensation step of subjecting those raw materials to polycondensation reaction in a molten state using a plurality of reaction tanks, and subsequently, pellets of the polycarbonate resin are formed through a step of stopping the reaction and devolatilization removing unreacted raw materials and reaction by-products in a molten reactant (not shown), and a step of adding a heat stabilizer, a release agent, a coloring material and the like (not shown).

In the raw material preparation step, a first raw material mixing tank 4 and a second raw material mixing tank 6 which are connected in series, a supply pump 7a for supplying a molten mixture of raw materials prepared to a polycondensation step, and a supply piping 5b are provided. An opening of the supply piping 5b is bonded to the side of a body part of a first vertical polymerization tank 8 described hereinafter. The first raw material mixing tank 4 and the second raw material mixing tank 6 are provided with, for example, anchor type stirring blades 3a and 3b, respectively.

Diphenyl carbonate (hereinafter sometimes referred to as DPC) as a carbonic diester is supplied in a molten state to the first raw material mixing tank 4 from a diphenyl carbonate supply port 1, and bisphenol A (hereinafter sometimes referred to as BPA) as an aromatic dihydroxy compound is supplied as a powder to the first raw material mixing tank 4 from a bisphenol A supply port 2.

In the polycondensation step, a first vertical polymerization tank 8, a second vertical polymerization tank 13 and a third vertical polymerization tank 14 which are connected in series, and a fourth horizontal polymerization tank 15 which is connected in series to the subsequent stage of the third vertical polymerization tank 14 are provided.

The first vertical polymerization tank 8 and the second vertical polymerization tank 13 are connected through a supply pump 7b and a supply piping 12a, and an opening of the supply piping 12a is bonded to the side of a body part of the second vertical polymerization tank 13.

The second vertical polymerization tank 13 and the third vertical polymerization tank 14 are connected through a supply pump 7c and a supply piping 12b, and an opening of the supply piping 12b is bonded to the side of a body part of the third vertical polymerization tank 14.

The third vertical polymerization tank 14 and the fourth horizontal polymerization tank 15 are connected through a supply pump 7d and a supply piping 12c.

The first vertical polymerization tank 8, the second vertical polymerization tank 13 and the third vertical polymerization tank 14 are provided with MAXBLEND blades 9a, 9b and 9c, respectively. The fourth horizontal polymerization tank 15 is provided with a stirring blade 16.

By-product distillation pipes 10a, 10b, 10c and 10d for discharging by-products and the like formed by the respective polycondensation reactions are fitted on to four polymerization tanks, respectively. The by-product distillation pipes 10a, 10b, 10c and 10d are connected to condensers 101a, 101b, 101c and 101d, respectively, and each polymerization tank is maintained in a given reduced pressure state by pressure reducing devices 102a, 102b, 102c and 102d.

In the present embodiment, a unit of a supply pump and a supply piping in combination, such as the raw material supply pump 7a and the supply piping 5b, the supply pump 7b and the supply piping 12a, the supply pump 7c and the supply piping 12b, and the supply pump 7d and the supply piping 12c, as described above is sometimes called a "supply unit". Further, at least one of an aromatic dihydroxy compound, a carbonic diester, an ester exchange catalyst, an oligocarbonate and a polycarbonate can be transferred using the supply unit. In this case, other components may be contained.

It is preferable to appropriately provide a backflow preventer for preventing backflow of a distillate in distillation pipes 10a, 10b, 10c and 10d provided on four polymerization tanks (the first vertical polymerization tank 8, the second vertical polymerization tank 13, the third vertical polymerization tank 14 and the fourth horizontal polymerization tank 15), respectively. In this case, the backflow preventer may be provided in each of distillation pipes 10a, 10b, 10c and 10d, respectively, and more preferably, the backflow preventer is provided at least in the distillation pipe 10c provided on the third vertical polymerization tank 14 (vertical polymerization tank) located just before the fourth horizontal polymerization tank 15 (horizontal polymerization tank).

The backflow preventer is provided preferably in the middle of each of the distillation pipes 10a, 10b, 10c and 10d, and more preferably at the polymerization tank side between the polymerization tank and the condenser. Such a backflow preventer is not particularly limited so far as it shows the function to prevent backflow of a distillate, and, for example, a pot-shaped preventer is used.

Although not shown, the molten reactant discharged from the fourth vertical polymerization tank 15 through a delivery piping 12d thereafter passes through a step of stopping the reaction and devolatilization removing unreacted raw materials and reaction by-products in the molten reactant, a step of adding a heat stabilizer, a release agent, a coloring material and the like, and a step of shaping a polycarbonate resin into pellets having a given particle diameter, thereby obtaining polycarbonate resin pellets.

In the production apparatus of a polycarbonate resin shown in FIG. 1, DPC melt prepared at the predetermined temperature and BPA powder weighed in a nitrogen gas atmosphere are continuously supplied to the first raw material mixing tank 4 from the DPC supply port 1 and the BPA supply port 2, respectively, in a nitrogen gas atmosphere. When the liquid level of the first raw material mixing tank 4 exceeds a predetermined height, the molten mixture of raw materials is transferred to the second raw material mixing tank 6 through the supply piping 5a.

The molten mixture of raw materials is then continuously supplied to the molten reactant in the first vertical polymerization tank 8 from the side of the body part of the first vertical polymerization tank 8 through the supply piping 5b by a raw material supply pump 7a. Further, cesium carbonate aqueous solution is continuously supplied as a catalyst from a catalyst supply port 5c in the middle of the supply piping 5b of the molten mixture of raw materials.

In the first vertical polymerization tank 8, polycondensation reaction is carried out under a nitrogen atmosphere, for example, while holding a temperature of 220° C., a pressure of 13.33 KPa (100 Torr) and the number of revolution of blade of 160 rpm and maintaining a liquid level 11a constant so as to be an average residence time of 60 minutes while distilling by-produced phenol from a by-product distillation pipe 10a.

The molten reactant discharged from the first vertical polymerization tank 8 is then continuously supplied to the second vertical polymerization tank 13, the third vertical polymerization tank 14 and the fourth horizontal polymerization tank 15 successively, and polycondensation reaction proceeds.

As shown in FIG. 1, in the present embodiment, the molten reactant discharged from the bottom of the first vertical polymerization tank 8 is continuously supplied to the molten reactant in the second vertical polymerization tank 13 from the side of the body part of the second vertical polymerization tank 13 through the supply piping 12a by the supply pump 7b.

Further, the molten reactant discharged from the bottom of the second vertical polymerization tank 13 is continuously supplied to the molten reactant in the third vertical polymerization tank 14 from the side of the body part of the third vertical polymerization tank 14 through the supply piping 12b by the supply pump 7c.

The reaction conditions in each polymerization tank are set respectively so as to be high temperature, high vacuum and low stirring rate with the progress of the reaction. During the polycondensation reaction, the average residence time in each polymerization tank is set to, for example, about 60 minutes by controlling liquid levels 11a, 11b and 11c, and in each polymerization tank, phenol by-produced is distilled from the by-product distillation pipes 10a, 10b, 10c and 10d.

As described above, in the production apparatus of a polycarbonate resin to which the present embodiment is applied, the molten mixture of raw materials is continuously supplied to the molten reactant in the first vertical polymerization tank 8 from the side of the body part of the first vertical polymerization tank 8. The molten reactant discharged from the bottom of the first vertical polymerization tank 8 is then continuously supplied to the molten reactant in the second vertical polymerization tank 13 from the side of the body part of the second vertical polymerization tank 13. Further, the molten reactant discharged from the bottom of the second vertical polymerization tank 13 is then continuously supplied to the molten reactant in the third vertical polymerization tank 14 from the side of the body part of the third vertical polymerization tank 14.

Thus, when the production apparatus of a polycarbonate resin is provided with a supply piping which supplies the molten mixture of raw materials or the molten reactant to the molten reactant in the polymerization tank on the side of the body part of the polymerization tank, the amount of foreign matters in the final product, which is conventionally considered due to that the molten mixture of raw materials or the molten reactant scatters at the outlet of a supply port, can greatly be reduced.

FIG. 2A, FIG. 2B, FIG. 2C or FIG. 2D is a view explaining other embodiment of a supply piping connecting to a polymerization tank.

FIG. 2A and FIG. 2B are views explaining an insertion pipe in which an opening of the supply piping connecting to the polymerization tank opens in a gas phase part in the polymerization tank. In FIG. 2A, the molten mixture of raw materials or the molten reactant is supplied to a vertical polymerization tank 22 equipped with a stirring blade 20 through a supply piping 18a by a supply pump 17, an ester exchange reaction is conducted in a predetermined average residence time while maintaining a liquid level 21, and the molten reactant is discharged to the next step from the bottom of the vertical polymerization tank 22 through a delivery piping 23. The inside of the vertical polymerization tank 22 is maintained in a reduced pressure state by a given pressure reducing device (not shown). Further, by-produced phenol and the like are distilled from a by-product distillation pipe 19.

As shown in FIG. 2A, the tip portion of the supply piping 18a constitutes an insertion pipe which is inserted in the inside of the vertical polymerization tank 22 from an upper top board of the vertical polymerization tank 22. An opening of the insertion pipe is located at nearly the middle between the upper top board of the vertical polymerization tank 22 and the liquid level 21.

Similarly, FIG. 2B shows that the tip portion of the supply piping 18b constitutes an insertion pipe which is inserted in the inside of the vertical polymerization tank 22 from an upper top board of the vertical polymerization tank 22, and an opening of the insertion pipe is located in the vicinity of the liquid level 21 of the vertical polymerization tank 22.

Length of the insertion pipe is not particularly limited, but is generally 30 cm or more from the upper top board of the vertical polymerization tank 22, and preferably a length close to the liquid level as possible. Where length of the insertion pipe is too short, there is the tendency that the molten mixture of raw materials or the molten reactant scatters at the opening of the insertion pipe and adheres to the vicinity of the opening of the insertion pipe.

Thus, when the production apparatus of a polycarbonate resin is provided with an insertion pipe which supplies the molten mixture of raw materials or the molten reactant to a gas phase part between the upper top board of the polymerization tank and the liquid level in the polymerization tank, the amount of foreign matters in the final product, which is conventionally considered due to that the molten mixture of raw materials or the molten reactant scatters at the outlet of a supply port, can greatly be reduced.

Similar to FIG. 1, FIG. 2C and FIG. 2D show an example in which a supply pipe connects to the side of a body part of a polymerization tank.

FIG. 2C is that an opening of a supply piping 18c opens on a wall surface of the side of a body part of the vertical polymerization tank 22. In this case, for example, there is the possibility that designing breadth of the vertical polymerization tank 22, such as ease of fitting a heat exchange coil to the vertical polymerization tank 22, expands.

FIG. 2D shows an example that the molten mixture of raw materials or the molten reactant is supplied from an insertion pipe (supply piping 18d) provided on the side of a body part of the vertical polymerization tank 22. The insertion pipe (supply piping 18d) is inserted in the vertical polymerization tank 22 from a direction nearly vertical to the axis of the stirring blade 20.

Another method to which the embodiment of the present invention is applied is characterized in that the relationship of the following formula (1) is satisfied at least in the case of polycondensation in the third vertical polymerization tank 14.

$$t1 < T \leq t2 \tag{1}$$

In the formula (1), t1 is a boiling point (unit: ° C.) under a pressure in the third vertical polymerization tank 14, of a by-produced monohydroxy compound distilled as a by-product during polycondensation by an ester exchange reaction between an aromatic dihydroxy compound and a carbonic diester.

T is a wall surface temperature (unit: ° C.) of a distillation pipe 10c fitted to the third vertical polymerization tank 14 to distill a by-product.

t2 is an inner temperature (unit: ° C.) of the third vertical polymerization tank 14.

The wall surface temperature (T) of the distillation pipe 10c used herein is an average value of a supply temperature and a discharge temperature of a heat medium to the distillation pipe 10c when the distillation pipe 10c is a double pipe. Further, in the case of water vapor trace or an electrical trace, T means a trace temperature.

It is known that polycondensation by an ester exchange reaction between an aromatic dihydroxy compound and a carbonic diester proceeds by removing by-products. Most of by-products are a by-produced monohydroxy compound represented by phenol. In particular, in the polycondensation step in which three vertical polymerization tanks are connected in series as shown in FIG. 1, viscosity of the molten reactant increases in the third vertical polymerization tank 14 with the progress of polycondensation reaction, and it is important to efficiently remove by-products in order to proceed polycondensation reaction.

Where the wall surface temperature (T) of the distillation pipe 10c is lower than the boiling point (t1) under a pressure in the third vertical polymerization tank 14, of the by-produced monohydroxy compound, it is difficult to efficiently remove by-products, and there is the tendency that polycondensation by an ester exchange reaction between an aromatic dihydroxy compound and a carbonic diester is not accelerated.

Further, because viscosity of the molten reactant in the third vertical polymerization tank 14 increases with the progress of polycondensation reaction as described above, entrainment materials such as a polymerization raw material and a low molecular weight polycarbonate may be drawn in the distillation pipe 10c fitted to the third vertical polymerization tank 14, together with the by-produced monohydroxy compound.

In this case, when the wall surface temperature (T) of the distillation pipe 10c is higher than the inner temperature (t2) of the third vertical polymerization tank 14, there is the tendency that entrainment materials burned at high temperature adhere to the wall surface of the distillation pipe 10c. Such an adherent drops in the third vertical polymerization tank 14 from the wall surface of the distillation pipe 10c during operation for a long period of time, resulting in "burned" foreign matters, and this is not preferable on quality.

To prevent crystallization of a low molecular weight carbonate drawn in the distillation pipe 10c, it is preferable that the wall surface temperature (T) of the distillation pipe 10c is 230° C. or higher, and it is more preferable to further provide a backflow preventer (not shown) in the middle of the distillation pipe 10c. Such a backflow preventer is provided to prevent backflow of an effluent, foreign matters and the like into the polymerization tank, and a pot-shaped backflow preventer is generally used.

Examples of the material which forms at least the inner wall part of the distillation pipe 10c include iron materials having an iron content of 20% or more, such as SUS304, SUS316 and SUS316L; iron materials having an iron content of 20% or less; and non-iron metal materials such as nickel and titanium. When iron materials having an iron content of 20% or more are used, it is preferable that electrolytic polishing treatment is applied to the inner wall part of the distillation pie 10c. Where the electrolytic polishing treatment is not applied to the inner wall part of the distillation pipe 10c constituted of an iron material having an iron content of 20% or more, a polycarbonate resin produced may color, and yellow index (YI) of a resin tends to increase.

It is described in detail above with respect to the application of the formula (1) in the third vertical polymerization tank 14 of the production apparatus of a polycarbonate resin shown in FIG. 1, but the relationship of the formula (1) is not limited to the third vertical polymerization tank 14, and can apply to polycondensation reaction in the first vertical polymerization tank 8, the second vertical polymerization tank 13 or the fourth horizontal polymerization tank 15.

In the production method of a polycarbonate resin, to which the present embodiment is applied, when using a production apparatus comprising a plurality of vertical polymerization tanks each equipped with a stirrer, connected in series in the polycondensation step as shown in FIG. 1, it is preferable to conduct the production of a polycarbonate resin under the conditions satisfying the relationship of the formula (1) in at least the third vertical polymerization tank 14 which is a final vertical polymerization tank connected.

As further preferable embodiment of the present invention, in the production apparatus of a polycarbonate resin it is preferable to conduct the production of a polycarbonate resin by using the production apparatus equipped with a supply piping which supplies a molten mixture of raw materials or a molten reactant to a molten reactant in a polymerization tank on the side of a body part of the polymerization tank as shown in FIG. 1 under the conditions satisfying the relationship of the formula (1) in at least the third vertical polymerization tank 14 which is a final vertical polymerization tank connected. However, the present invention is not limited to the above-described embodiment.

The present invention is described in more detail based on the following Examples. However, the invention is not limited to the following Examples so far as it does not depart from its gist.

Example 1

Production of a polycarbonate resin was conducted using the production apparatus constituted of two raw material mixing tanks, three vertical polymerization tanks and one horizontal polymerization tank as shown in FIG. 1 as described above under the following conditions.

First, in a raw material preparation step, DPC (diphenyl carbonate) and BPA (bisphenol A) were mixed at a constant molar ratio (DPC/BPA=1.064) in a nitrogen gas atmosphere to prepare a DPC/BPA molten mixture.

Next, in a polycondensation step, the molten mixture prepared in the raw material preparation step was continuously supplied to a first vertical polymerization tank 8 equipped with a MAXBLEND blade 9a through a transfer pipe. The first vertical polymerization tank 8 had a volume of 10.8 m$^3$, and the inside of the polymerization tank was controlled to a temperature of 222° C., a pressure of $1.33 \times 10^4$ Pa and a stirring rate of 59 rpm.

The molten mixture was continuously supplied to the vertical polymerization tank 8 at a flow rate of 4,483 kg/hr. Further, the degree of opening of a valve (not shown) provided in a polymer discharge line at the bottom of the tank was controlled such that an average residence time in the first vertical polymerization tank 8 is 75 minutes, thereby maintaining the liquid level constant.

Subsequently, supply of the molten mixture was initiated, and at the same time, cesium carbonate in a form of an aqueous solution as a catalyst was continuously supplied from a catalyst supply port 5c in the middle of a transfer pipe of the molten mixture. The amount of the catalyst supplied was 1.0 μmol per 1 mol of BPA (as cesium metal amount, 2.0 μmol per 1 mol of BPA).

Next, a molten reactant discharged from the bottom of the first vertical polymerization tank 8 was subsequently continuously supplied to a second vertical polymerization tank 13 (volume: 12.6 m$^3$), a third vertical polymerization tank 14 (volume: 9.0 m$^3$) and a fourth horizontal polymerization tank 15 (volume 15.5 m³), successively, and taken out of a polymer discharge port at the bottom of the fourth horizontal polymerization tank 15.

Reaction conditions (temperature, pressure and stirring rate) in the second vertical polymerization tank to the fourth horizontal polymerization tank 15 were 260° C., 4.00×10³ Pa and 59 rpm in the second vertical polymerization tank 13; 274° C., 700 Pa and 69 rpm in the third vertical polymerization tank 14; and 280° C., 170 Pa and 3 rpm in the fourth horizontal polymerization tank 15. The fourth horizontal polymerization tank 15 is equipped with a stirring blade 16.

In the polycondensation step, the temperature, pressure and stirring rate in each polymerization tank were set as the polycondensation reaction proceeds. Further, the liquid level in each polymerization tank was controlled so as to be a reaction time such that the reaction residence times in the second vertical polymerization tank 13 to the fourth horizontal reaction tank 15 are 75 minutes (second vertical polymerization tank 13), 38 minutes (third vertical polymerization tank 14) and 113 minutes (fourth horizontal polymerization tank 15).

In each polymerization tank, phenol by-produced simultaneous with the polycondensation reaction was distilled away from the polymerization tank through a distillation pipe fitted to the respective polymerization tanks. Distillation pipes 10a and 10b made of electrolytically polished SUS310S were fitted to the first vertical polymerization tank 8 and the second vertical polymerization tank 13, respectively, and distillation pipes 10c and 10d made of electrolytically polished SUS316L were fitted to the third vertical polymerization tank 14 and the fourth horizontal polymerization tank 15, respectively. Wall surface temperature of each of the distillation pipes (10a, 10b, 10c and 10d) fitted to those four polymerization tanks respectively was maintained at 120° C.

Under the above conditions, production operation of a polycarbonate resin was continued for 3 months, the operation was stopped, and the inner walls of the distillation pipes (10a to 10d) fitted to the respective polymerization tanks were observed. As a result, an adherent which is deemed crystallized foreign matters was slightly observed on the inner wall of the distillation pipe 10c fitted to the third polymerization tank 14, but did not clog the inside of the distillation pipe. Foreign matters were not observed in distillation pipes (10a, 10b and 10d) other than the distillation pipe 10c.

Further, foreign matters were scarcely observed in a polycarbonate resin obtained in the production operation for 3 months.

The number of foreign matters was 5 in 500 g of a polycarbonate resin. The number of foreign matters was obtained by measuring the number of foreign matter having a size of 40 µm or more in 500 g of polycarbonate resin pellets using a microscope.

Example 2

Production operation of a polycarbonate resin was continued for 3 months under the same conditions as in Example 1, except that in the production apparatus used in Example 1, the wall surface temperature of the distillation pipe 10c fitted to the third vertical polymerization tank 14 in the polycondensation step was changed to 240° C.

Only 2 foreign matters were observed in 500 g of the polycarbonate resin produced in the production operation for 3 months.

Example 3

A polycarbonate resin was produced in the same manner as in Example 2, except that a pot-shaped backflow preventer (not shown) was provided in the middle of the distillation pipe 10c (between the third vertical polymerization tank 14 and a condenser 101c, and near the third vertical polymerization tank 14c) fitted to the third vertical polymerization tank 14 in the polycondensation step. Only 1 foreign matter was observed in 500 g of the polycarbonate resin produced in the production operation for 3 months.

Comparative Example 1

Production operation of a polycarbonate resin was continued for 1 month under the same conditions as in Example 1, except that in the production apparatus used in Example 1, the wall surface temperature of the distillation pipe 10c fitted to the third vertical polymerization tank in the polycondensation step was maintained at a temperature of 50° C. which is lower than the boiling point (67° C.) of phenol by-produced under the pressure (700 Pa) of the third vertical polymerization tank 14, and on the other hand, the wall surface temperature of the distillation pipes (10a, 10b and 10d) fitted to the first vertical polymerization tank 8, the second vertical polymerization tank 13 and the fourth horizontal polymerization tank 15, respectively, was adjusted to 120° C.

One month after, the operation was stopped, and the inner wall of the distillation pipe fitted to each polymerization tank was observed. As a result, the by-produced phenol, crystallized foreign matters and the like adhered to the inner wall of the distillation pipe 10c fitted to the third vertical polymerization tank 14, hence the pipe inside was slightly clogged. Therefore, it was impossible to maintain the pressure in the polymerization system. Additionally, many crystallized foreign matters were observed in the polycarbonate resin.

Comparative Example 2

Production operation of a polycarbonate resin was continued for 3 months under the same conditions as in Example 1, except that in the production apparatus used in Example 1, the wall surface temperature of the distillation pipe 10c fitted to the third vertical polymerization tank in the polycondensation step was maintained at a temperature 280° C. which is higher than the temperature (274° C.) of the third vertical polymerization tank 14, and on the other hand, the wall surface temperature of the distillation pipes (10a, 10b and 10d) fitted to the first vertical polymerization tank 8, the second vertical polymerization tank 13 and the fourth horizontal polymerization tank 15, respectively, was adjusted to 120° C.

Three months after, the operation was stopped, and the inner wall of the distillation pipe fitted to each polymerization tank was observed. As a result, by-produced phenol, crystallized foreign matters and the like did not adhered to the inner wall of the distillation pipe 10c fitted to the third vertical polymerization tank 14, but much burned foreign matters of a polycarbonate resin entrained with the by-produced phenol were observed.

Further, there was the case that yellow index (YI) of the polycarbonate resin obtained during the production operation increased, thus showing the tendency that the color tone becomes unstable. Furthermore, much foreign matters were observed in the polycarbonate resin.

Measurement method of the yellow index (YI) is as follows.

A 100 mm square sheet having a thickness of 3 mm was molded under the conditions of a barrel temperature of 280° C. and a mold temperature of 90° C. using an injection molding machine (J100SS-2, manufactured by Japan Steels Works, Ltd.). With respect to this sheet, tristimulus values X, Y and Z which are the absolute values of color were measured with a color tester (SC-1-CH, manufactured by Suga Test Instruments Co., Ltd.), and YI value which is the measure of yellow index was calculated by the following relational expression.

$$YI=(100/Y)\times(1.28X-1.062Z)$$

This shows that coloration increases as the YI value increases.

Polymerization conditions in the third vertical polymerization tank 14 and the results are shown in Table 1.

TABLE 1

| Third vertical Polymerization tank | Example 1 | Example 2 | Example 3 | Comparative Example 1 | Comparative Example 2 |
|---|---|---|---|---|---|
| Pressure (Pa) | 700 | 700 | 700 | 700 | 700 |
| Boiling point t1 of phenol distilled (° C.) | 67 | 67 | 67 | 67 | 67 |
| Inner wall temperature T of distillation pipe (° C.) | 120 | 240 | 240 | 50 | 280 |
| Inner temperature t2 of polymerizetion tank (° C.) | 274 | 274 | 274 | 274 | 274 |
| Yellow index | 1.1 | 1.2 | 1.2 | 1.3 | 2.5 |
| Number of foreign matters | 5 | 2 | 1 | 100 | 250 |

As described in detail above, according to the production apparatus and production method of a carbonate resin to which the present embodiment is applied, introduction of foreign matters from the top board of a polymerization tank, and drop of crystallized foreign matter, "burned" foreign matters and the like from a distillation pipe are prevented, and a polycarbonate resin in which such foreign matters are reduced can be produced.

While the invention has been described in detail and with reference to specific embodiments thereof, it will be apparent to one skilled in the art that various changes and modifications can be made therein without departing from the spirit and scope thereof.

This application is based on Japanese patent application (Patent Application No. 2006-166620) filed Jun. 15, 2006, Japanese patent application (Patent Application No. 2006-167047) filed Jun. 16, 2006 and Japanese patent application (Patent Application No. 2007-042180) filed Feb. 22, 2007, the entire contents thereof being hereby incorporated by reference.

INDUSTRIAL APPLICABILITY

The polycarbonate resin thus obtained can suitably be used to building materials such as sheets; containers such as bottles for water; optical lenses such as lenses of head lamps for automobiles, glasses; optical recording media such as optical discs; light guide plates such as liquid crystal displays; and the like.

The invention claimed is:

1. A production apparatus for a polycarbonate resin, comprising:
a plurality of polymerization tanks comprising at least one vertical polymerization tank having an insertion pipe through which a molten reactant is supplied,
wherein the insertion pipe is positioned such that the molten reactant is supplied to a gas phase part of the at least one vertical polymerization tank, and the insertion pipe has an opening at the gas phase part between a top board of the vertical polymerization tank and a liquid level of a molten reactant in the vertical polymerization tank.

2. The production apparatus of a polycarbonate resin as claimed in claim 1, wherein the polymerization tanks are vertical polymerization tanks each equipped with a stirring device.

3. The production apparatus of a polycarbonate resin as claimed in claim 2, wherein one of the polymerization tanks comprises a transfer piping configured to supply the molten reactant to another of the polymerization tanks.

4. The production apparatus of a polycarbonate resin as claimed in claim 1, wherein the polymerization tanks comprise:
a plurality of vertical polymerization tanks connected in series; and
at least one horizontal polymerization tank positioned downstream of the vertical polymerization tanks,
each of the polymerization tanks comprises:
a pressure reducing device configured to maintain a reduced pressure in the polymerization tank;
a distillation pipe configured to distill away by-products; and
a condenser configured to condense by-products distilled externally of the tank, and
the polymerization tanks are configured to produce at least one polycarbonate resin by an ester exchange reaction between an aromatic dihydroxy compound and a carbonic diester.

5. The production apparatus of a polycarbonate resin as claimed in claim 4, wherein the distillation pipe comprises an iron material having an iron content of 20% or more in at least an inner wall portion of the distillation pipe.

6. The production apparatus of a polycarbonate resin as claimed in claim 4, wherein the distillation pipe comprises a backflow preventer configured to prevent a distillate from flowing backwardly.

7. A production method for a polycarbonate resin, which comprises:
preparing a molten mixture of raw materials comprising a dihydroxy compound comprising an aromatic dihydroxy compound and a carbonic diester; and
continuously polycondensing the molten mixture of the raw materials by an ester exchange reaction between the dihydroxy compound and the carbonic diester in the presence of an ester exchange catalyst in a plurality of polymerization tanks comprising at least one vertical polymerization tank,
wherein the molten mixture of the raw materials is polycondensed in the at least one vertical polymerization tank, a molten reactant produced by an ester exchange reaction is supplied to a gas phase part of the at least one vertical polymerization tank through an insertion pipe having an opening at the gas phase part between a top board of the at least one vertical polymerization tank and a liquid level of a molten reactant in the at least one vertical polymerization tank.

8. The production method for a polycarbonate resin as claimed in claim 7, wherein the molten mixture of the raw materials is polycondensed in a production apparatus having a plurality of vertical polymerization tanks which are connected in series and at least one horizontal polymerization tank positioned downstream of the vertical polymerization tanks, and each of the polymerization tanks has a pressure reducing device configured to maintain a reduced pressure in the tank, a distillation pipe configured to distill away by-products, and a condenser configured to condense by-products distilled externally of the polymerization tank.

9. A production method for a polycarbonate resin, which comprises:
producing a polycarbonate resin by an ester exchange reaction between a dihydroxy compound comprising an aromatic dihydroxy compound and a carbonic diester,
wherein the relationship of a boiling point t1 (° C.) of a by-produced monohydroxy compound under a pressure in a reactor which conducts an ester exchange reaction, a wall surface temperature T (° C.) of a distillation pipe which distills a by-produced monohydroxy compound from the reactor, and an inner temperature t2 (° C.) in the reactor satisfies the following formula (1)

$$t1 < T \leq t2 \tag{1}$$

10. The production method for a polycarbonate resin as claimed in claim 9, wherein the relationship of T (° C.) and t2 (° C.) further satisfies the following formula (2)

$$230(° C.) < T \leq t2 \tag{2}$$

11. The production method for a polycarbonate resin as claimed in claim 9, wherein the reactor is a vertical polymerization tank comprising a pressure reducing device configured to maintain a reduced pressure in the vertical polymerization tank, and a condenser configured to condense a by-produced monohydroxy compound distilled externally of the reactor from the distillation pipe.

12. The production method for a polycarbonate resin as claimed in claim 11, wherein the distillation pipe is equipped with a backflow preventer configured to prevent a distillate from flowing backwardly.

13. The production method for a polycarbonate resin as claimed in claim 9, wherein at least an inner wall portion of the distillation pipe is formed of an iron material having an iron content of 20% or more.

14. The production method for a polycarbonate resin as claimed in claim 9, wherein the by-produced monohydroxy compound is phenol.

15. A production method for a polycarbonate resin, comprising:
providing a polymerization apparatus configured to conduct a continuous ester exchange reaction, the polymerization apparatus having a plurality of vertical polymerization tanks which are connected in series, at least one horizontal polymerization tank connected to the vertical polymerization tanks, and a distillation pipe provided at the upper portion of the at least one of the vertical polymerization tanks, the distillation pipe being configured to distill a monohydroxy compound by-produced in the ester exchange reaction from the polymerization tanks; and
conducting a continuous ester exchange reaction between a dihydroxy compound comprising an aromatic dihydroxy compound and a carbonic diester such that a boiling point t1 (° C.) of a by-produced monohydroxy compound under a pressure in the vertical polymerization tanks, an inner temperature t2 (° C.) in the vertical polymerization tanks, and a wall surface temperature T (° C.) of the distillation pipe satisfy the following formula (3)

$$t1 < T \leq t2 \tag{3}$$

16. The production method for a polycarbonate resin as claimed in claim 15, wherein, in a vertical polymerization tank located just before the at least one horizontal polymerization tank, t1 (° C.), t2 (° C.) and T (° C.) satisfy the formula (3).

17. The production method for a polycarbonate resin as claimed in claim 15, wherein the distillation pipe connected to the vertical polymerization tank is further provided with a backflow preventer configured to prevent a distillate from flowing backwardly.

18. The production method for a polycarbonate resin as claimed in claim 15, wherein the vertical polymerization tanks comprise a first vertical polymerization tank and a second vertical polymerization tank, the molten reactant produced by an ester exchange reaction between an aromatic dihydroxy compound and a carbonic diester in the first vertical polymerization tank is supplied to the second vertical polymerization tank through an insertion pipe or a transfer piping positioned on the side of the second vertical polymerization tank, and the molten reactant is supplied to a liquid phase in the second vertical polymerization tank through the insertion pipe or the transfer piping.

19. The production method for a polycarbonate resin as claimed in claim 17, wherein the vertical polymerization tanks comprise a first vertical polymerization tank and a second vertical polymerization tank, the molten reactant produced by an ester exchange reaction between a dihydroxy compound comprising an aromatic dihydroxy compound and a carbonic diester in the first vertical polymerization tank is supplied to the second vertical polymerization tank through an insertion pipe or a transfer piping positioned on the side of the second polymerization tank, and the molten reactant is supplied to a liquid phase in the second polymerization tank through the insertion pipe or the transfer piping.

20. The production apparatus of a polycarbonate resin as claimed in claim 1, wherein the polymerization tanks comprise three vertical polymerization tanks and one horizontal polymerization tank.

21. The production method for a polycarbonate resin as claimed in claim 7, wherein the dihydroxy compound consists of an aromatic dihydroxy compound.

* * * * *